Sept. 2, 1952     E. H. HOWLAND ET AL     2,609,101
FILTER INCLUDING AUTOMATIC RECONDITIONING DEVICE
Filed July 7, 1949     2 SHEETS—SHEET 1

INVENTORS
Eugene H. Howland &
Raymond G. Tessmer
BY
Bean, Brooks, Buckley & Bean.
ATTORNEYS

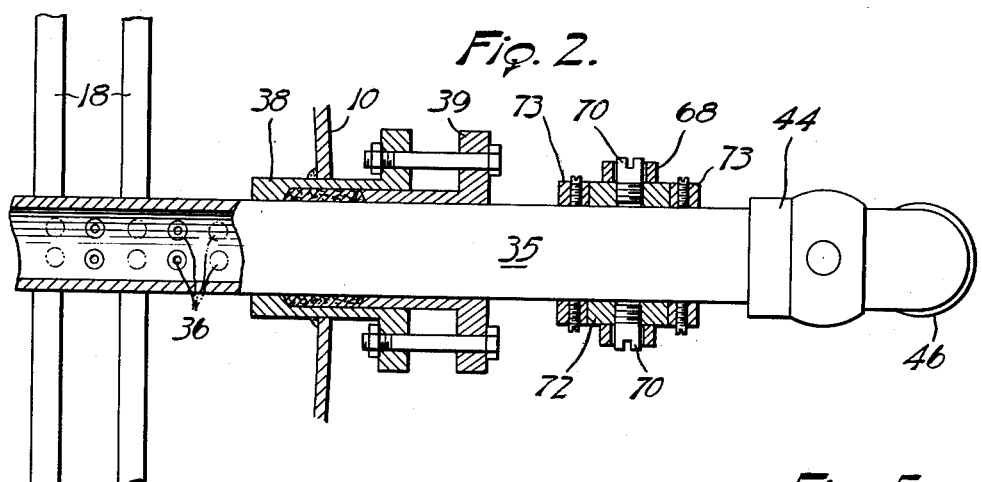
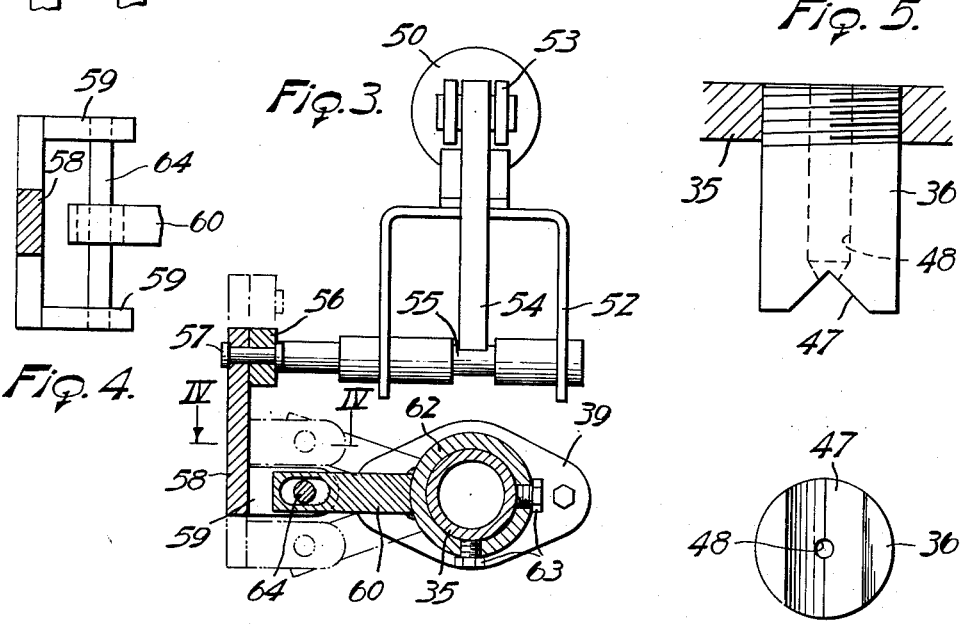
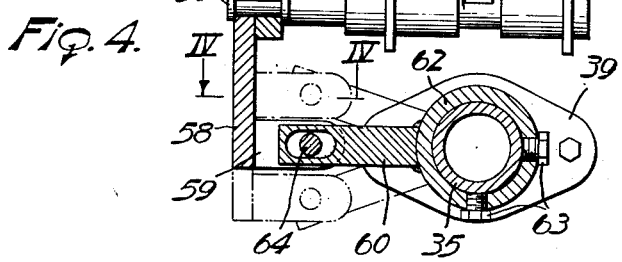
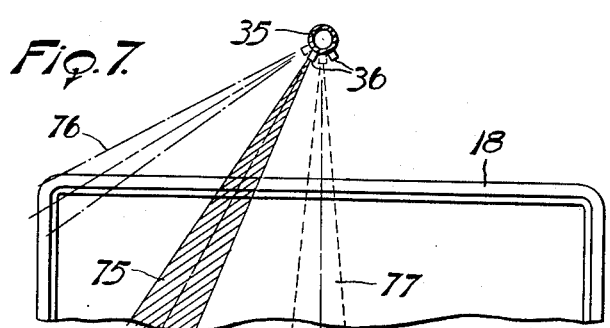

Patented Sept. 2, 1952

2,609,101

UNITED STATES PATENT OFFICE 2,609,101

FILTER INCLUDING AUTOMATIC RECONDITIONING DEVICE

Eugene H. Howland, Grand Island, and Raymond G. Tessmer, Tonawanda, N. Y., assignors to Arnold Jacobowitz, Buffalo, N. Y.

Application July 7, 1949, Serial No. 103,398

8 Claims. (Cl. 210—182)

This invention relates to industrial filter devices, and more particularly to improvements in vertical leaf type filters used in manufacturing processes such as in the clarification of liquids, beverages, and the like. More specifically, the present invention relates to improved means for periodically cleaning such devices of the deposited solids which in time accumulate against the surfaces of the filter leaves.

In the normal operation of clarification filtering equipment so-called "filter aids" comprising solid materials of fine particle size are often mixed with the liquid to be filtered and in some cases are "pre-coated" against the filter leaves before commencement of a production filtering cycle. In any case, the filtering operation results in constant deposition from the liquid being processed of filtered solids which form cakes of increasing thickness against the filter leaves; and after such cakes acquire sufficient thickness to prevent an efficient rate of liquid flow through the filter unit the deposited solids must be removed. For this purpose it is normal procedure in connection with filtering devices of the prior art to shut down the entire filtering system and to remove the cover plate of the filter leaf containing tank so as to enable an operator to wash down the leaves as by a hosing operation, whereby the solids accumulations are removed from the filter leaves and flushed to a sewer. Inasmuch as filter tanks designed for installation in pressured systems require a large number of bolts to seal the covers of the tanks thereof, the operations of opening and closing such covers are slow and laborious; and in any case such cleaning methods require that the entire manufacturing process incorporating the filtering operation must be shut down for the relatively long period during which the filtering unit is opened and then washed down and then closed again.

Whereas, we are aware that filter leaf spraying devices have been previously proposed for example as set forth in U. S. Reissue Patent 14,213, the arrangements thereof are deficient from the standpoint of providing adequately automatic filter cleaning operations; and therefore it is an object of the present invention to provide in a vertical leaf pressure filter unit an accumulated solids washing mechanism which is operable automatically to provide an improved type filter leaf washing action, without requiring that the tank housing the filter leaves be opened.

Another object of the invention is to provide in a vertical leaf type pressure filter unit improved means mechanically operable to periodically wash down the filter leaves and to remove the solids accumulations therefrom without requiring the tank housing the leaves to be opened; whereby the entire operation of reconditioning the filter leaves requires only a relatively small amount of time, and no appreciable labor, and a minimum of wash water.

A still further object of the invention is to provide in a pressure filter unit an improved leaf cleaning mechanism which is wholly mounted upon the detachable cover member of the filter tank; whereby the tank cover may be removed as for inspection of the interior of the filter unit without requiring the leaf cleaning mechanism to be disconnected from its liquid and power supply sources.

It is another object of the present invention to provide in a pressure filter unit of the character described an improved self-clearing drain effect for handling dislodged solid caked material in improved manner.

It is a further object of the present invention to provide a filter leaf cleaning device employing fluid spraying equipment so arranged as to give improved flexibility of control and filter leaf covering operation.

A still further object of the invention is to provide an improved filter leaf cleaning mechanism of the character aforesaid in combination with a control system of improved character, whereby the filter leaf cleaning operation may be automatically performed as controlled from a remote control station.

A still further object of the present invention is to provide a filter leaf cleaning mechanism of the character aforesaid which is of such type as to be adapted for installation with equal facility in new equipment and in equipment already in operation.

Other objects and advantages of the invention will appear in the specification hereinafter.

In the drawings:

Fig. 2 is a fragmentary section, on an enlarged scale, taken along line II—II of Fig. 1;

Fig. 3 is a fragmentary section, on an enlarged scale, taken along line III—III of Fig. 1;

Fig. 4 is a section taken along line IV—IV of Fig. 3;

Figs. 5 and 6 are enlarged sectional and end views, respectively, of one of the fluid spray jet elements of the device; and Fig. 7 is a diagrammatic illustration of the scope of the filter leaf cleaning operation of the mechanism of the invention.

Figure 1:
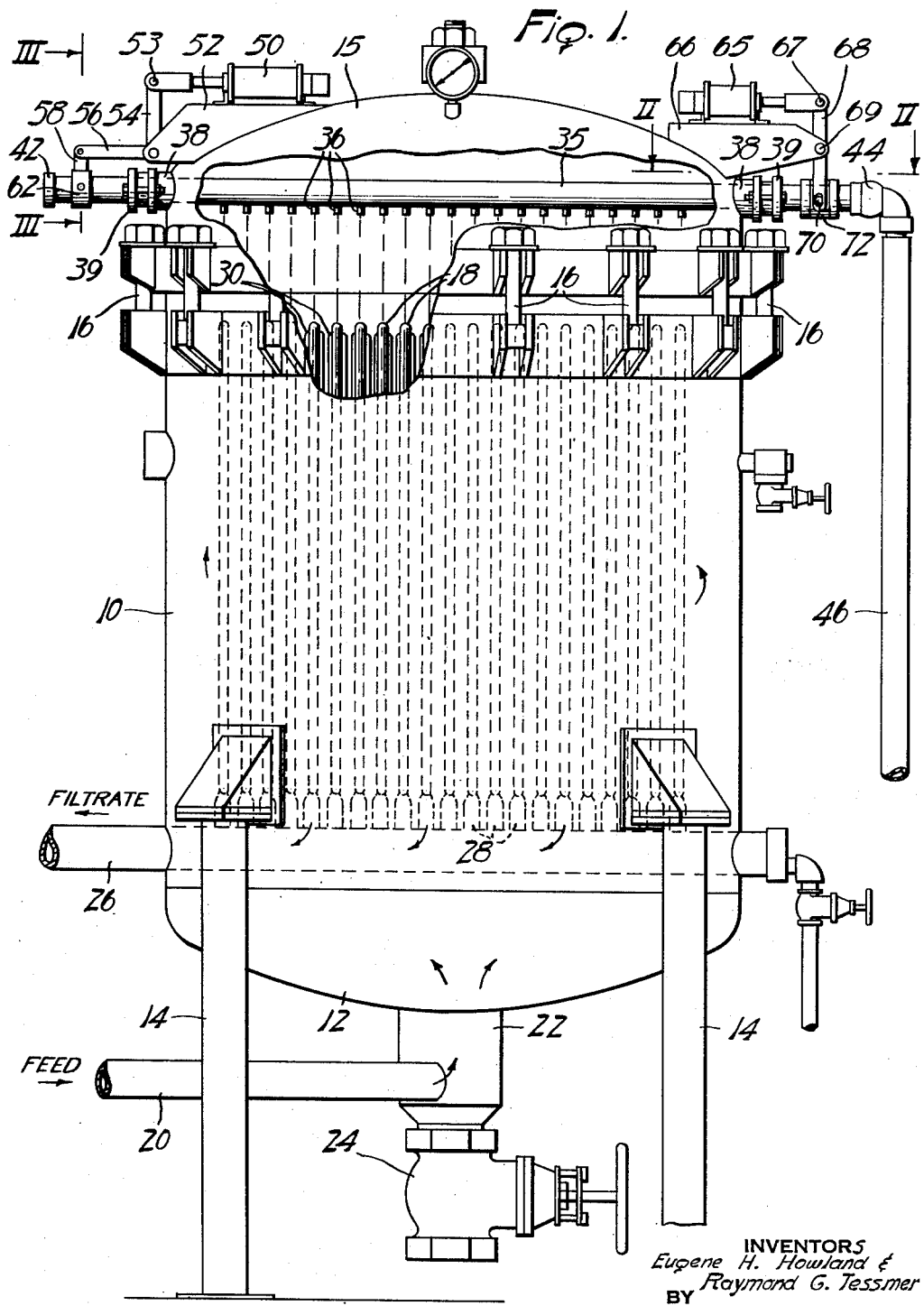
Fig. 1 is a side elevational view of a pressure filter unit of the invention, with parts of the tank broken away to show portions of the filter leaf elements and of a filter leaf cleaning device of the present invention as installed therein.

The invention is illustrated in the drawing in conjunction with a vertical leaf pressure tank filter unit comprising generally a cylindrical casing 10 having a closed bottom 12 and mounted upon legs 14. A top cover 15 is arranged to slip-fit down upon the upper end of the casing 10 in sealing relation thereon, and lock bolts 16 are provided at suitable intervals around the junction between the casing and the cover for detachably locking the cover in place. The filter leaves are illustrated at 18 as being racked within the container 10 in side-by-side relation as is customary in the art. A liquid inlet conduit 20 is connected in open communication with the interior of the bottom section of the casing 10, as through an enlarged header 22, and is arranged to receive a supply of liquid to be filtered as from a pressure pump (not shown). The header 22 is also fitted with a relatively large size drain valve 24 for use when cleaning out the filter unit, as will be explained in detail hereinafter. The filtrate outlet conduit is indicated at 26 and it will be understood of course that this conduit may be arranged to convey the filtrate to any desired point of use for further treatment, as the case may require.

As explained hereinabove, the filter leaf arrangement to which the present invention applies is of conventional form, and thus it will be understood that the filter leaves 18 may comprise any desired type of fabrication including essentially in each case a pair of screen devices arranged in back-to-back relation so as to provide a filtrate conducting space therebetween. The screen devices are relatively sealed around the marginal edges thereof, and thus it will be appreciated that as the liquid to be filtered is received under pressure through the conduit 20 it moves upwardly into the interior of the tank 10 so as to immerse the filter leaf units and to press thereagainst from all sides. Then, as the liquid filters through the screen devices of the filter units it is clarified as it gains access to the interiors thereof and then flows downwardly into the filtrate manifold portions 28 for collection and delivery into the filtrate outlet conduit 26.

Referring still to Fig. 1 of the drawing, the filter aid cake and accumulated solids deposit at opposite sides of the filter units are indicated at 30; and it will be appreciated that whenever the solids accumulations thereon attain sufficient extent to close the spaces between adjacent filter units and/or to seriously detract from the liquid conducting capacity of the unit, the solids accumulations must be disrupted and removed. In accord with the present invention a spray head 35 in the form of a pipe having a plurality of spray jets 36 aligned longitudinally thereon is journalled within the tank cover 15 so as to extend diametrically thereof while being both longitudinally slidable and axially rockable thereon, as by means of bearings 38—38. Packing glands as indicated at 39—39 are arranged in conjunction with the spray head 35 at each side of the tank 10 so as to fluid-seal the bearing mountings therebetween. At one end the spray head 35 is closed as by means of a screw cap 42 (Fig. 1) and at its other end it fits into a pressure sealed rotating fitting 44 to which is coupled a flexible hose 46 through which a suitable supply of wash water or any other liquid or liquid and gas mixture such as steam and water or the like may be delivered under pressure. As shown in Figs. 5-6, the nozzles 36 may be formed by transversely grooving bar stock as indicated at 47 and then drilling a central hole 48 from the other end so as to intersect the groove; thereby providing a reduced orifice and a flat spray discharge. Then the nozzles are mounted upon the pipe 35 so that the sprays therefrom issue flatwise parallel to the filter leaves 18. However, any other type nozzle may of course be employed.

In accord with the present invention the spray head 35 is arranged to be mechanically oscillated within the bearings 38—38 and simultaneously reciprocated longitudinally in such manner that as spray fluid issues from the nozzles 36 the jets of fluid therefrom will sweep back and forth across the rack of filter leaves while simultaneously describing swinging arcs of water sprays between adjacent leaf units. To oscillate the spray head 35 about its longitudinal center line we show herein a pneumatic piston-cylinder device 50 which is mounted upon the top cover 15 of the tank unit, as by means of a bracket 52. The piston of the unit 50 pivotally connects at a clevis portion 53 with a crank arm 54 which is carried by a shaft 55 which is in turn journalled upon the bracket 52 (Fig. 3). The shaft 55 also carries a crank arm 56 which pivotally connects at 57 with a link 58 mounting a pair of fingers 59—59 which pivotally connect with a crank arm 60 carried by a collar 62 which is keyed to the spray head 35 by means of set screws 63. The fingers 59—59 connect to the crank 60 by means of a lost motion slot in the arm 60 and a pivot pin 64 (Fig. 4). Thus, it will be appreciated that reciprocation of the piston within the cylinder unit 50 will cause the spray head 35 to rock about its longitudinal axis within the journals 38—38 of the tank cover member.

To provide for longitudinal reciprocation of the spray head 35 within the cover member we show in Fig. 1 a second pneumatic piston-cylinder unit 65 as being mounted upon the top cover 15 by means of a bracket element 66. The piston element of the unit connects by means of a pivot clevis device 67 to one end of a lever 68 which is pivotally mounted at 69 upon the bracket 66; the other end of the lever 68 being pivotally connected by means of a lost motion pivot device 70 to a thrust collar 72 which is freely rotatable on the pipe 35 but held against longitudinal displacement thereon by means of fixed collars 73—73 (Fig. 2). Thus, it will be understood that reciprocal operation of the piston within the cylinder units 65 will cause the spray head 35 to similarly reciprocate in directions parallel to its longitudinal axis; and that in connection with all such movements of the spray head the packing glands 39—39 will maintain the unit in fluid-sealed relation.

Thus, the spray head 35 is equipped with any desired type spray nozzle devices such as will direct jets of fluid downwardly between the filter leaf units so as to forcibly disrupt the caked solids thereon and to wash downwardly between the filter leaf units into the lower end of the tank 10 and thence out through the header 22 and the valve 24 to the desired disposal point; and it is a particular feature and advantage of the present invention that the spray head is controlled fully automatically so as to simultaneously rock and oscillate longitudinally, thereby directing the jets of wash fluid to issue therefrom with a particularly efficacious washing action against the solids deposited on the filter leaves. It is by reason of this novel action that the wash fluid jets attack the deposited solids alternately from substantially opposite directions, and thereby bore into and disrupt the crusted solids accumulations in a superior manner. Furthermore, it will be appreciated of course, that this improved sluicing action is obtained without requiring the tank enclosing the filter leaves to be opened and without any operator attention except to handle the controls so as to start and stop the automatic sluicing operation whenever desired. Incidentally, in event the disrupted solids tend to plug the drain valve or header, the pressure within the tank operating against the plugged drain will build up to the maximum pressure of the sluice water supply line if necessary, to force the debris through the drain.

Whereas, the pneumatic cylinders have been illustrated and described as being used to effect the movements of the spray head 35, it will of course be understood that any other suitable mechanisms may be employed in lieu thereof, but that in any case they will preferably be independently controlled so as to operate at different speeds, whereby the motion cycles thereof are out of phase so that the entire interior of the tank is sprayed without development of a repeated pattern spray path. This insures most efficient cleaning of the tank contents. It will of course be understood that any preferred type of nozzle may be employed, and that they may be variously arranged on the spray pipe 35. For example, as shown in the drawing, the nozzles may be paired to project jets of water in divergent streams, and in such case Fig. 7 illustrates the scope of sweep of one of the spray nozzles as the header 35 is rocked to direct the spray from the mid-portion 75 as to maximum outward and inward positions 76—77, respectively. The oppositely paired nozzle will of course be simultaneously sweeping the other half of the filter leaf assembly. However, any other suitable spray arrangement may be employed as long as the spray head rocks and oscillates transversely of the filter leaf pack to provide the improved sluice effect of the present invention.

Particular attention is called to the fact that the spray head 35 and all of the actuating mechanisms thereof are mounted upon and carried by the top cover 15 of the filter tank 10; whereby the entire mechanism moves with the cover member whenever the latter is removed from the tank, thereby avoiding possible interference with access to the interior of the tank in connection with servicing operations thereon. Although only one form of the invention has been shown and described in detail it will be apparent to those skilled in the art that the invention is not so limited but that various changes may be made therein without departing from the spirit of the invention or the scope of the appended claims.

We claim:

1. A filter unit comprising an open top casing, a plurality of filter leaves disposed in parallel relation within said casing and individually coupled to a filter outlet manifold, a top cover for said casing and means for detachably locking said cover in closed position upon said casing, liquid inlet means for delivering under pressure into said casing a supply of liquid to be filtered whereby the latter flows against said filter leaves and the filtrate flows through the interiors of said leaves and thence through said manifold while the solids filtered out of said liquid are deposited against the outer surfaces of said leaves, and solids removal means for clearing away said deposited solids as required to maintain said leaves in efficient filtering condition, said removal means comprising a fluid spray header of tubular form mounted within said top cover to extend diametrically of said casing and formed with fluid spray nozzle devices at intervals therealong, and motor means operatively connected between said top cover and said spray header for mechanically rocking said header about its longitudinal axis and simultaneously and independently reciprocating said header in axial directions.

2. A filter unit comprising a vertically elongate tank open at the top, a plurality of filter leaves disposed in parallel relation within said tank and individually coupled to a filter outlet manifold, a top cover for said tank and means for detachably locking said cover in closed position upon said tank, liquid inlet means for delivering into said tank under pressure a supply of liquid to be filtered whereby the latter flows against said filter leaves and the filtrate flows through said leaves and thence through said manifold while the solids filtered out of said liquid are deposited against the outer surfaces of said leaves, and solids removal means for clearing away said deposited solids as required to maintain said leaves in efficient filtering condition, said removal means comprising a fluid spray header of tubular form mounted within said cover to extend diametrically of said tank and formed with fluid spray nozzle devices at intervals therealong, said spray nozzle devices being formed to provide a relatively flat spray, motor means operatively connected between said cover and said spray header for mechanically rocking said header about its longitudinal axis and separate and independently controlled means operatively connected between said spray header and said cover for simultaneously reciprocating said header in axial directions.

3. A filter unit comprising an open top casing, a plurality of filter leaves disposed in parallel relation within said casing and individually coupled to a filter outlet manifold, a top cover for said casing and means for detachably locking said cover in closed position upon said casing, liquid inlet means for delivering into said casing under pressure a supply of liquid to be filtered whereby the latter flows against said filter leaves and the filtrate flows through the interiors of said leaves and thence through said manifold while the solids filtered out of said liquid are deposited against the outer surfaces of said leaves, casing drainage means at the bottom of said casing, and solids removal means for clearing away said deposited solids as required to maintain said leaves in efficient filtering condition, said removal means comprising a fluid spray header of tubular form mounted through a wall portion of said cover for rocking and axially reciprocating movements therewithin and to extend diametrically of said casing and formed with fluid spray nozzle devices at intervals therealong, said nozzle devices being formed to provide a substantially flat spray paralleling said leaves, and means for mechanically rocking said header about its longitudinal axis and simultaneously reciprocating said header in axial directions to provide a chiseling spray effect for disrupting said solids depositions and washing the latter downwardly and out of said drainage means.

4. A filter unit comprising a casing, a plurality of filter leaves disposed in parallel relation within said casing and individually coupled to a filter outlet manifold, liquid inlet means for delivering into said casing under pressure a supply of liquid to be filtered whereby the latter flows against said filter leaves and the filtrate flows through the interiors of said leaves and thence through said manifold while the solids filtered out of said liquid are deposited against the outer surfaces of said leaves, and solids removal means for clearing away said deposited solids as required to maintain said leaves in efficient filtering condition, said removal means comprising a fluid spray header of tubular form mounted for rotary and axially reciprocal movements and to extend diametrically of said casing and generally perpendicularly to the planes of said leaves and formed with fluid spray nozzle devices at intervals therealong, said nozzle devices being formed to provide a relatively flat spray paralleling said leaves, means for actuating said header to rock about its longitudinal axis and means for simultaneously actuating said header to reciprocate in axial directions whereby to provide a chiseling spray effect.

5. A filter unit comprising a casing, a plurality of filter leaves disposed in parallel relation within said casing, liquid inlet means for delivering into said casing a supply of liquid to be filtered whereby the latter flows against said filter leaves and the filtrate flows through the interiors of said leaves and thence to an outlet while the solids filtered out of said liquid are deposited against the outer surfaces of said leaves, and solids removal means for clearing way said deposited solids as required to maintain said leaves in efficient filtering condition, said removal means comprising a fluid spray header formed with fluid spray nozzle devices at intervals therealong, mounting means for said header for rotary and axially reciprocal movements thereof relative to said filter leaves, and means for mechanically rocking said header about its longitudinal axis and simultaneously independently reciprocating said header between spaced points in a direction normal to the plane of rocking.

6. A filter unit comprising a vertically elongate tank open at the top, a top cover arranged to be detachably secured to said tank, a plurality of filter leaves disposed within said tank in vertically edgewise attitude, liquid inlet means for delivering into said tank a supply of liquid to be filtered whereby the latter flows against said filter leaves and the filtrate flows through said leaves and thence through an outlet while the solids filtered out of said liquid are deposited against the outer surfaces of said leaves, and solids removal means for clearing away said deposited solids as required to maintain said leaves in efficient filtering condition, said removal means comprising a fluid spray header mounted in said top cover to extend generally horizontally above said leaves and to be rockable and axially reciprocable, said header being formed with fluid spray nozzle devices at intervals therealong, means for mechanically rocking said header about an axis and means for simultaneously reciprocating said header in directions axially of said rocking movements.

7. A filter unit comprising a vertically elongate casing open at the top, a top cover detachably secured to said casing, a plurality of filter leaves disposed in edgewise vertical parallel relation within said casing, liquid inlet means for delivering into said casing a supply of liquid to be filtered whereby the latter flows against said filter leaves and the filtrate flows through the interiors of said leaves and thence through an outlet while the solids filtered out of said liquid are deposited against the outer surfaces of said leaves, casing drainage means at the bottom of said casing, and solids removal means for clearing away said deposited solids as required to maintain said leaves in efficient filtering condition, said removal means comprising a fluid spray header carried by said top cover and mounted to be rotatable and axially reciprocable and to extend above said leaves, said header being formed with fluid spray nozzle devices at intervals therealong, said spray nozzle devices being formed to provide a relatively flat spray paralleling said leaves, and means for mechanically rocking said header about an axis and simultaneously reciprocating said header axially thereof for disrupting said solids depositions and washing the latter downwardly and out of said drainage means.

8. A filter unit comprising a casing, a plurality of filter leaves disposed in vertically edgewise parallel relation within said casing, liquid inlet means for delivering into said casing a supply of liquid to be filtered whereby the latter flows against said filter leaves and the filtrate flows through said leaves while the solids filtered out of said liquid are deposited against the outer surfaces of said leaves, and solids removal means for clearing away said deposited solids as required to maintain said leaves in efficient filtering condition, said removal means comprising a fluid spray header formed with short fluid spray nozzle devices at intervals therealong directed perpendicularly to the axis thereof, said nozzle devices being formed to provide a relatively flat spray paralleling said leaves, means mounting said spray header to be rotatable and axially reciprocable and to extend crosswise above said leaves, means for actuating said header to rock about its longitudinal axis, and means for simultaneously and independently actuating said header to reciprocate axially thereof.

EUGENE H. HOWLAND.
RAYMOND G. TESSMER.

REFERENCES CITED

The following references are of record in the file of this patent:

UNITED STATES PATENTS

| Number | Name | Date |
|---|---|---|
| 14,213 | Sweetland | Nov. 7, 1916 |
| 1,230,328 | Sailer | June 19, 1917 |
| 1,370,469 | Martel | Mar. 1, 1921 |
| 1,464,953 | Misener | Aug. 14, 1923 |
| 1,510,568 | Sweetland | Oct. 7, 1924 |
| 1,714,232 | Morris | May 21, 1929 |
| 1,943,811 | Child et al. | Jan. 16, 1934 |
| 2,243,559 | Griffith | May 27, 1941 |
| 2,278,148 | Monsarrat et al. | Mar. 31, 1942 |